US012313071B1

(12) United States Patent
Enke

(10) Patent No.: US 12,313,071 B1
(45) Date of Patent: May 27, 2025

(54) GEAR PUMP WITH SUCTION HOUSING ELEMENT PROVIDING A TIGHT SEAL BETWEEN SUCTION AND HIGH-PRESSURE CHAMBER TO INCREASE PUMP EFFICIENCY AND METHOD OF PROVIDING TIGHT SEAL

(71) Applicant: Hamilton Sundstrand Corporation, Charlotte, NC (US)

(72) Inventor: Olaf Enke, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/744,217

(22) Filed: Jun. 14, 2024

(51) Int. Cl.
*F04C 27/00* (2006.01)
*F04C 18/18* (2006.01)

(52) U.S. Cl.
CPC ............ *F04C 27/004* (2013.01); *F04C 18/18* (2013.01); *F04C 27/006* (2013.01); *F04C 27/007* (2013.01); *F04C 2240/50* (2013.01); *F04C 2240/56* (2013.01); *F04C 2240/80* (2013.01); *F05C 2251/10* (2013.01)

(58) Field of Classification Search
CPC ...... F04C 27/004; F04C 18/18; F04C 27/006; F04C 27/007; F04C 2240/50; F04C 2240/56; F04C 2240/80; F05C 2251/10
See application file for complete search history.

(56) References Cited

U.S. PATENT DOCUMENTS

| | | | | | |
|---|---|---|---|---|---|
| 2,252,661 | A * | 8/1941 | Oishei | F04C 18/18 418/126 |
| 2,420,622 | A * | 5/1947 | Lauck | F16H 39/34 29/888.023 |
| 4,165,206 | A | 8/1979 | Martin et al. | |
| 6,033,193 | A | 3/2000 | Pieters et al. | |
| 6,116,859 | A | 9/2000 | Bodzak et al. | |
| 6,935,851 | B2 | 8/2005 | Peters et al. | |
| 8,684,473 | B2 | 4/2014 | Nakazawa et al. | |
| 10,648,467 | B2 | 5/2020 | Takamiya et al. | |
| 11,852,142 | B2 | 12/2023 | Takamiya | |

FOREIGN PATENT DOCUMENTS

| | | | |
|---|---|---|---|
| CN | 2089990 | U * | 12/1991 |
| DE | 102011087749 | A1 | 6/2013 |
| NO | 20093508 | A1 * | 6/2011 |
| WO | 0032935 | A1 | 6/2000 |

* cited by examiner

*Primary Examiner* — Mary A Davis
(74) *Attorney, Agent, or Firm* — Kinney & Lange, P.A.

(57) ABSTRACT

A gear pump includes a pump housing, a two meshed with a driven gear, a suction housing, and a suction cavity. The suction housing includes a body portion having first and second sealing disposed adjacent to outer diameters of the gears. A suction chamber wall is disposed between the first and second sealing surfaces and a sealing land is adjacent to a planar running surface of the pump housing. A flange of the suction housing has a third sealing surface disposed in contact with gear faces of the gears. The suction cavity is open to the inlet and defined in part by the suction chamber wall.

20 Claims, 7 Drawing Sheets

GEAR PUMP WITH SUCTION HOUSING ELEMENT PROVIDING A TIGHT SEAL BETWEEN SUCTION AND HIGH-PRESSURE CHAMBER TO INCREASE PUMP EFFICIENCY AND METHOD OF PROVIDING TIGHT SEAL

BACKGROUND

The present disclosure relates generally to pumps and more particularly to gear pumps.

Gear pumps are known to have a lower pump efficiency than piston pumps due to higher internal leakage. Internal leakage results from imperfect fit or seal between interfacing components. Internal leakage can occur due to gear tip clearance and gear face clearance. Close tolerances between meshing gears and between gears and a pump housing create suction at a pump inlet and prevent fluid from a higher-pressure cavity from leaking back. As clearances increase with wear, leakage from the higher-pressure cavity back to the suction inlet can occur, reducing the volumetric pump efficiency. The reduction in volumetric efficiency can be significant at lower pump speeds.

SUMMARY

In one aspect, a gear pump includes a pump housing, a drive gear meshed with a driven gear, a suction housing, and a suction cavity. The pump housing includes a cavity having a planar running surface, an inlet extending through the pump housing and opening to the cavity at the planar running surface, and an outlet extending through pump housing and opening to the cavity. The drive gear and driven gear are disposed in the cavity and have a first gear face and a second gear face with the second gear face disposed on the planar running surface. The suction housing includes a body portion extending longitudinally from a first end to a second end and having first and second sealing surfaces extending longitudinally between the first and second ends and disposed adjacent to outer diameters of the drive gear and the driven gear, respectively. A suction chamber wall is disposed between the first and second sealing surfaces and a sealing land is at the second end adjacent to the planar running surface. A flange of the suction housing extends transverse to the body at the first end and has a third sealing surface disposed in contact with the first gear face of each of the drive gear and the driven gear. The suction cavity is open to the inlet and defined in part by the suction chamber wall.

In another aspect, a method of increasing efficiency of a gear pump includes providing a pump housing, a drive gear and a driven gear, and a suction housing, and applying an axial force and a radial force against the suction housing. The pump housing includes a cavity having a planar running surface, an inlet extending through the pump housing and opening to the cavity at the planar running surface, and an outlet extending through pump housing and opening to the cavity. The drive gear and the driven gear have parallel axes and mesh together, and each have a first gear face and a second gear face, the second gear face disposed on the planar running surface. The suction housing includes a first sealing surface and a second sealing surface extending parallel to and abutting outer diameters of the drive gear and the driven gear, respectively. A suction chamber wall is disposed between the first and second sealing surfaces and separated from the drive gear and the driven gear to form a suction chamber therebetween. A third sealing surface of the suction housing is disposed parallel to and abutting the second gear face of each of the drive gear and the driven gear, and a sealing land is disposed adjacent to the planar running surface. The axial force is applied to the suction housing to press the third sealing surface against the first gear faces of the drive gear and the driven gear. The radial force is applied to the suction housing to press the first and second sealing surfaces against the outer diameters of the drive gear and the driven gear.

The present summary is provided only by way of example, and not limitation. Other aspects of the present disclosure will be appreciated in view of the entirety of the present disclosure, including the entire text, claims and accompanying figures.

Figure 1:
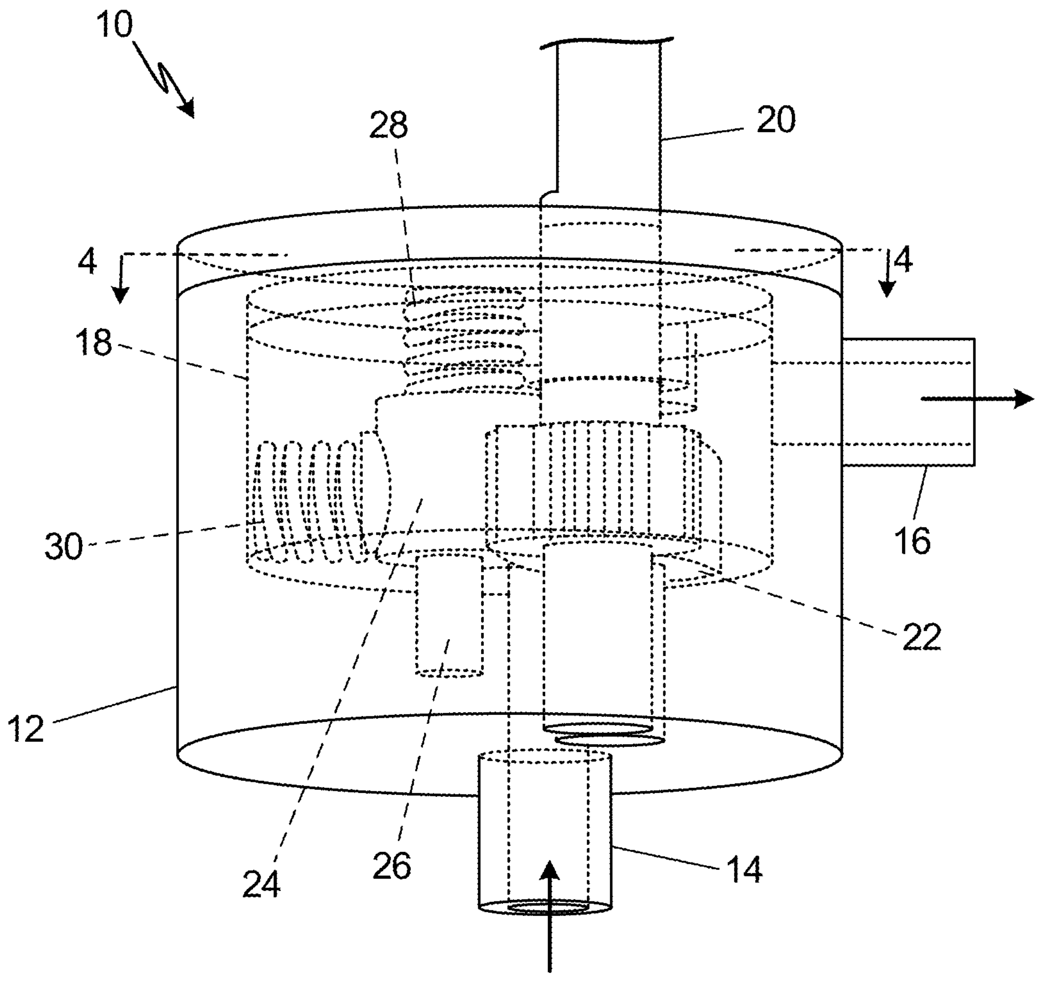
FIG. 1 is a perspective view of a portion of a gear pump showing a pump housing and internal components (shown in phantom).

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Internal leakage inside a gear pump can be reduced by creating a tight seal at contact surfaces that separate a low-pressure inlet from a high-pressure outlet cavity. As disclosed herein, a gap between sealing surfaces in an external gear pump can be reduced to near zero by wearing in the contact surfaces. In the present disclosure, tight clearances are achieved by applying axial and radial force to a suction housing disposed adjacent to gears and a housing cavity while the pump is running at a specified speed. Gains achieved in volumetric efficiency can enable reduction in size and weight of the gear pump.

FIG. 1 is a perspective view of a portion of gear pump 10 showing pump housing 12 and internal components (shown in phantom). FIG. 1 shows pump housing 12, fluid inlet 14, fluid outlet 16, cavity 18, drive gear 20, driven gear 22, suction housing 24, cylinder pin 26, first biasing member 28, and second biasing member 30.

Figure 2:
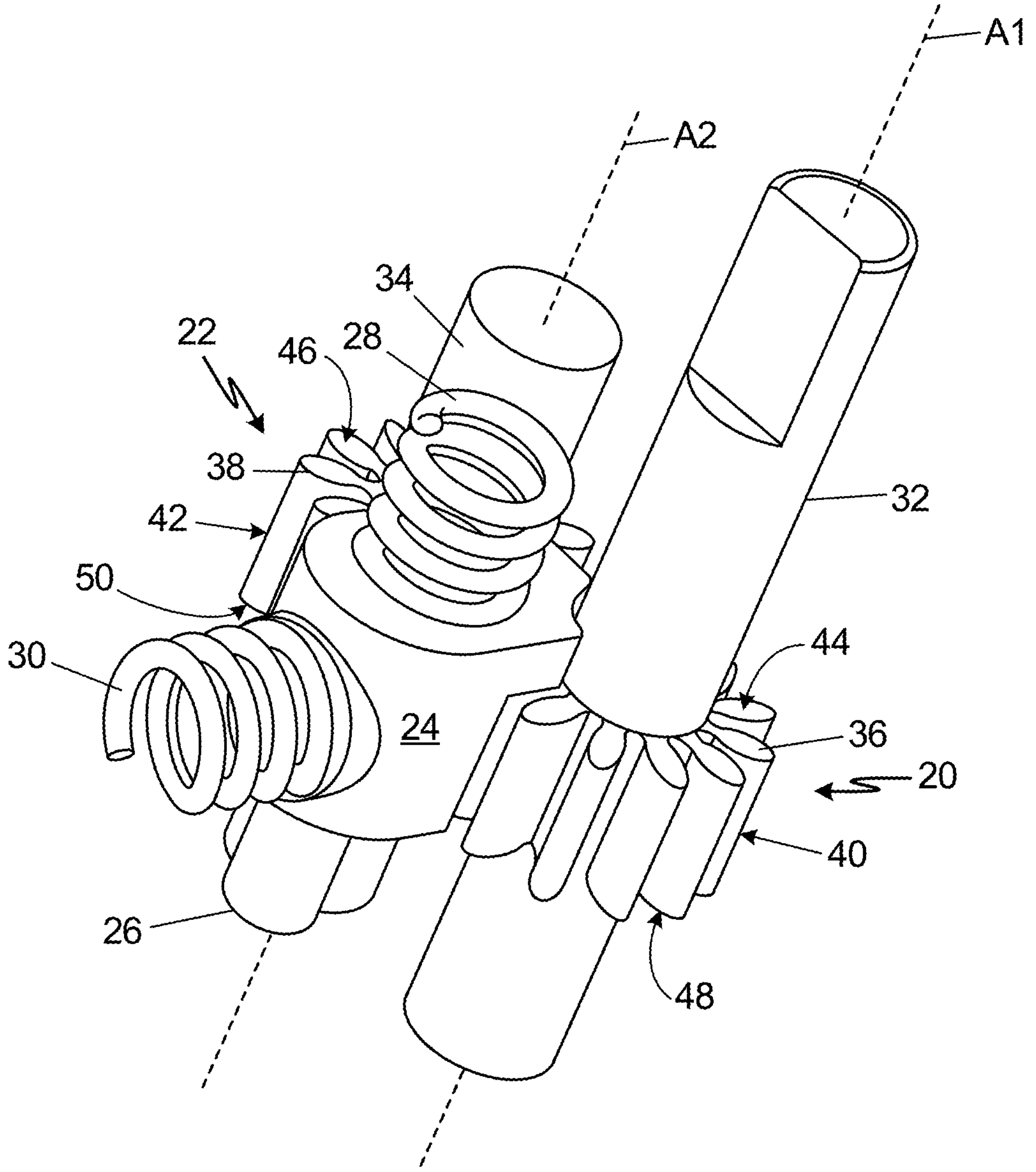
FIG. 2 is a perspective view of the internal components of FIG. 1.

FIG. 2 is a perspective view of the internal components of FIG. 1. FIG. 2 shows drive gear 20, driven gear 22, suction housing 24, cylinder pin 26, first and second biasing members 28 and 30, shafts 32 and 34, gear teeth 36 and 38, gear teeth tips 40 and 42, first gear faces 44 and 46, second gear faces 48 and 50, and axes of rotation A1 and A2.

Figure 3A:
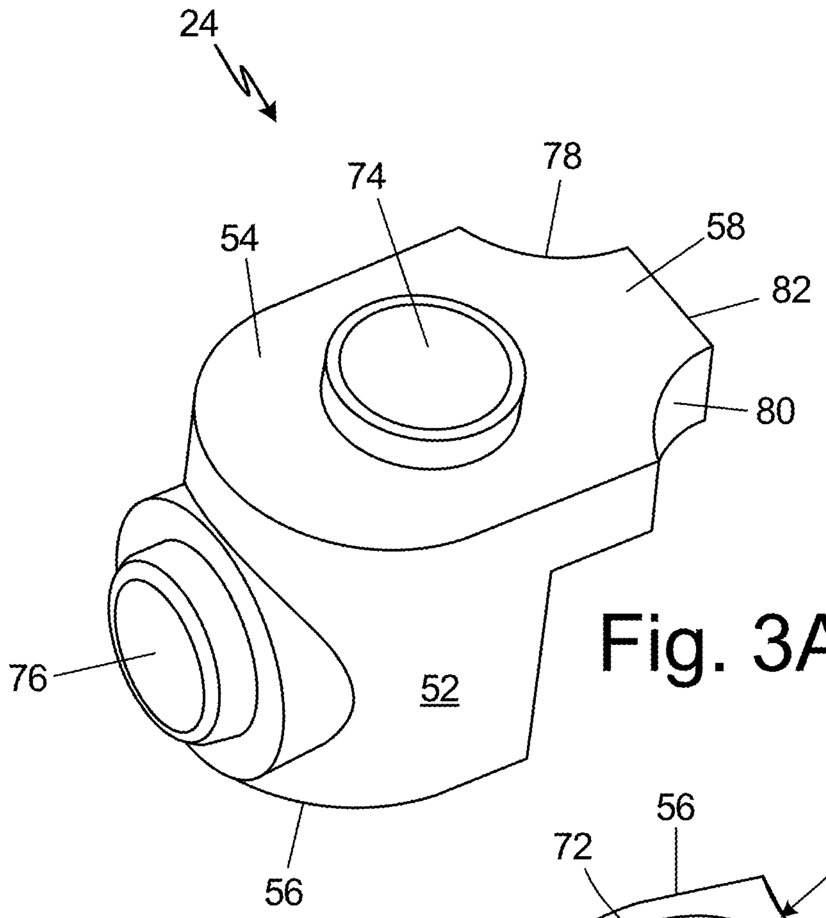
FIGS. 3A and 3B are perspective views of a suction housing of the gear pump of FIG. 1.
Figure 3B:
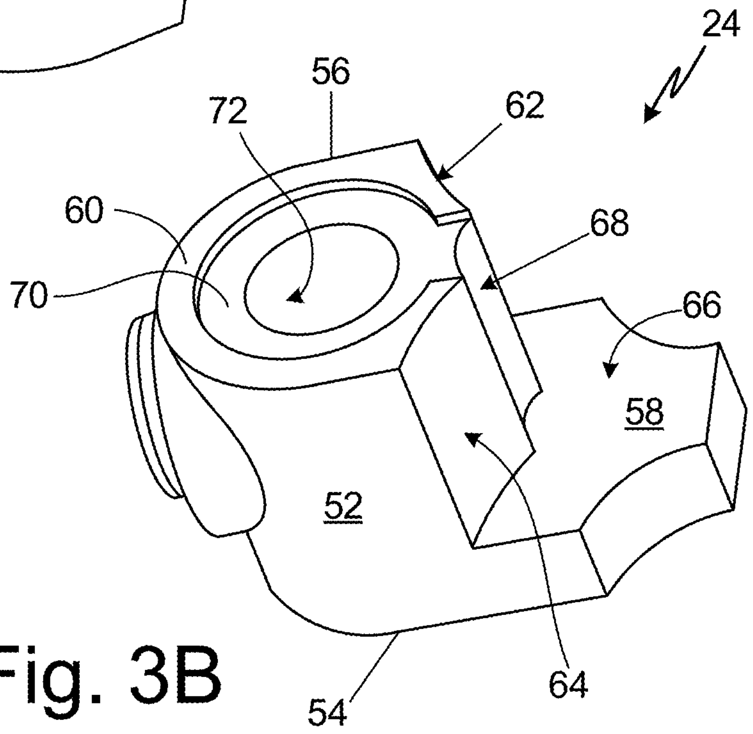

FIGS. 3A and 3B are perspective views of suction housing 24. FIGS. 3A and 3B show body 52, first end 54, opposing second end 56, flange 58, scaling land 60, first, second, and third sealing surfaces 62, 64, 66, suction chamber wall 68, suction cavity 70, bore wall 72, first and second retention members 74 and 76, cutouts 78 and 80, and flange end 82.

Figure 4:
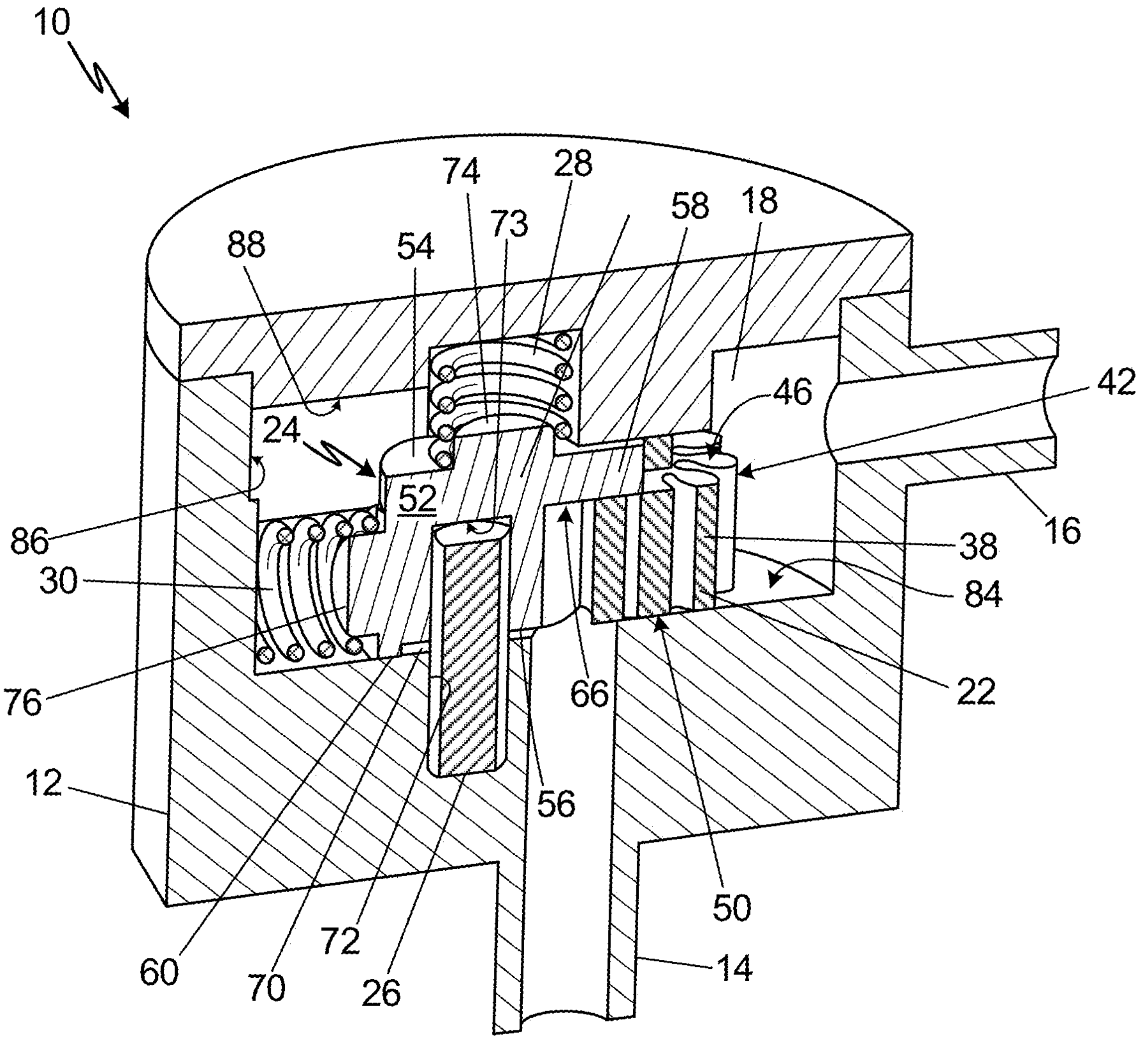
FIG. 4 is a perspective cross-sectional view of the portion of the gear pump taken along the 4-4 line of FIG. 1.

FIG. 4 is a perspective cross-sectional view of the portion of gear pump 10 taken along the 4-4 line of FIG. 1. FIG. 4 shows pump housing 12, fluid inlet 14, fluid outlet 16, cavity 18, driven gear 22, suction housing 24, cylinder pin 26, first biasing member 28, second biasing member 30, gear teeth 38, gear teeth tips 42, first gear face 46, second gear face 50, body 52, first end 54, opposing second end 56, flange 58, sealing land 60, third sealing surface 66, suction cavity 70, bore wall 72, bore end 73, first and second retention members 74 and 76, planar running surface 84, side wall 86, and top wall 88.

Figure 5:
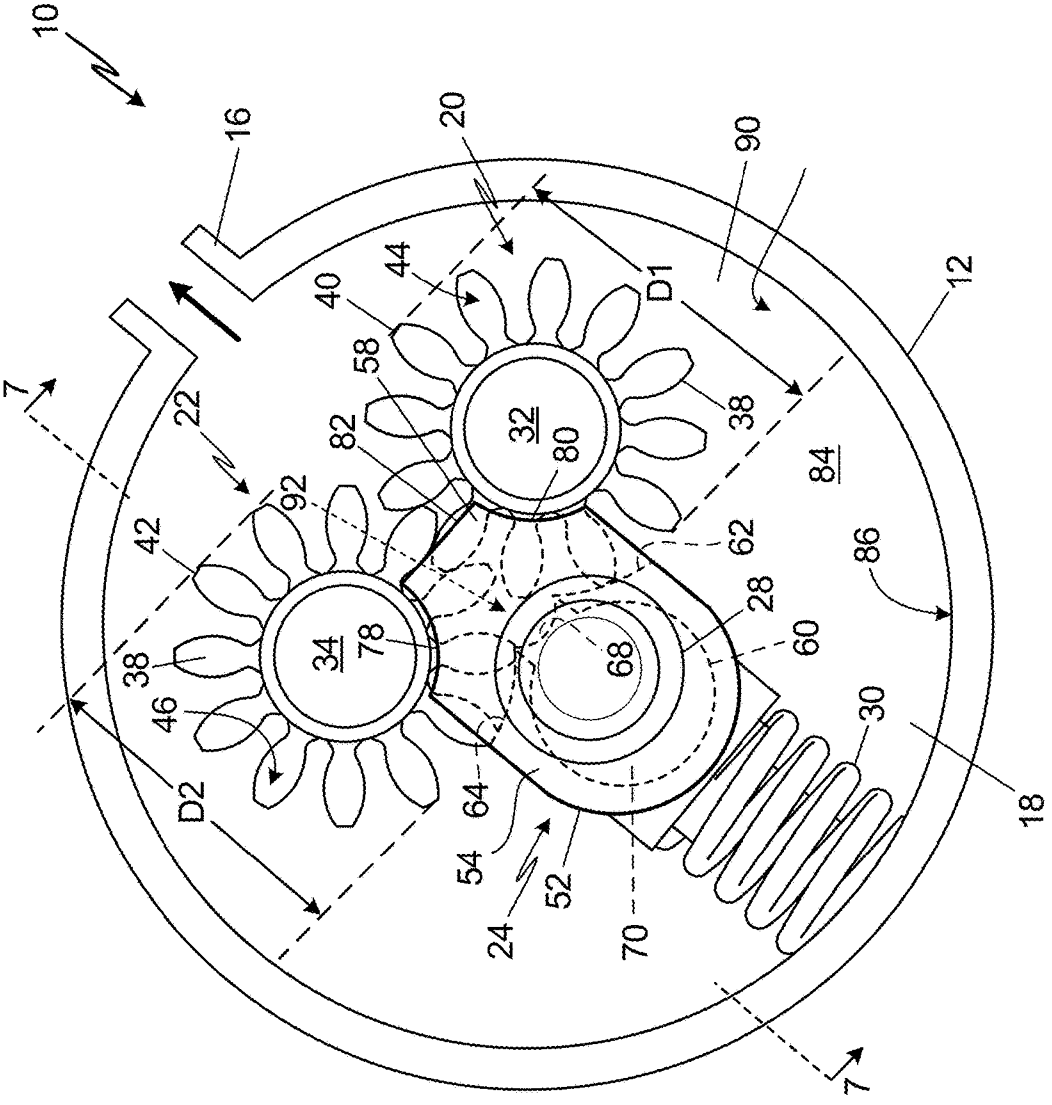
FIG. 5 is a top cutaway view of the portion of the gear pump of FIG. 1 with a top portion of a housing removed.

FIG. 5 is a top view of the internal components of gear pump 10. FIG. 5 shows pump housing 12, fluid outlet 16, cavity 18, drive gear 20, driven gear 22, suction housing 24, first and second biasing members 28 and 30, shafts 32 and 34, gear teeth 36 and 38, gear teeth tips 40 and 42, first gear faces 44 and 46, body 52, flange 58, sealing land 60 (shown in phantom), first and second sealing surfaces 62 and 64 (shown in phantom), suction chamber wall 68 (shown in phantom), suction cavity 70 (shown in phantom), cutouts 78 and 80, and flange end 82, suction chamber 92, drive gear diameter D1, and driven gear diameter D2. FIGS. 1-5 are discussed together herein.

Pump housing 12 includes fluid inlet 14, fluid outlet 16, and cavity 18. Cavity 18 can be defined by planar running surface 84, side wall 86, and top wall 88. Side wall 86 extends between planar running surface 84 and oppositely disposed top wall 88. Side wall 86 can be oriented perpendicular to planar running surface 84. Side wall 86 can be annular. Planar running surface 84 is configured to interface with drive gear 20 and driven gear 22. Fluid inlet 14 extends through pump housing 12, opening to cavity 18 at planar running surface 84. Fluid outlet 16 extends through pump housing 12 and is open to cavity 18. Fluid outlet 16 can be disposed through side wall 86 of cavity 18.

Drive gear 20 and driven gear 22 are disposed in cavity 18. Drive gear 20 has shaft 32, gear teeth 36 with gear teeth tips 40, first gear face 44, and opposing second gear face 48. Driven gear 22 has shaft 34, gear teeth 38 with gear teeth tips 42, first gear face 46, and opposing second gear face 50. Drive gear 20 is configured to mesh with and drive driven gear 22. Shaft 32 of drive gear 20 can be coupled to a motor (now shown) configured to apply rotational force to drive gear 20. Drive gear 20 and driven gear 22 rotate about parallel axes A1 and A2. Fluid inlet 14 and fluid outlet 16 are disposed on opposites sides of a mesh point of drive gear 20 and driven gear 22. Fluid outlet 16 can be disposed at any suitable location on side wall 86 or, alternatively, through top wall 88 opposite planar running surface 84. Drive gear 20 has outer diameter D1 defined by gear teeth tips 40. Driven gear 22 has outer diameter D2 defined by gear teeth tips 42. D1 can be equal to D2. Drive gear 20 and driven gear 22 can be spaced from side wall 86.

Suction housing 24 is disposed in cavity 18. Suction housing 24 includes body 52 and flange 58. Body 52 can include sealing land 60, first and second scaling surfaces 62 and 64, suction chamber wall 68, suction cavity 70, bore wall 72, and first and second retention members 74 and 76. Flange 58 can include third sealing surface 66, cutouts 78 and 80, and flange end 82. First retention member 74 can be disposed on a portion of flange 58.

Suction housing 24 can be secured to pump housing 12 with cylinder pin 26. Cylinder pin 26 is a retention member received in a bore in pump housing 12 opening to planar running surface 84 and a bore in suction housing 24 opening to second end 56 and defined by bore wall 72 and closed bore end 73. Cylinder pin 26 can be press fit into the bore in pump housing 12. Cylinder pin 26 extends about an axis parallel with drive gear axis A1 and driven gear axis A2. Bore wall 72 in suction housing 24 extends parallel to first and second sealing surfaces 62 and 64 and suction chamber wall 68. As discussed further herein, the bore defined by bore wall 72 has a diameter that is greater than a diameter of cylinder pin 26 such that suction housing 24 can move radially relative to an axis of cylinder pin 26.

Body 52 of suction housing 24 extends longitudinally between opposing first and second ends 54 and 56. First and second sealing surfaces 62 and 64 can extend longitudinally between first and second ends 54 and 56. First sealing surface 62 is disposed adjacent to gear teeth tips 40 of drive gear 20. Second sealing surface 64 is disposed adjacent to gear teeth tips 42 of driven gear 22. First and second sealing surfaces 62 and 64 can be concave with a curvature matching a curvature of drive gear outer diameter OD1 and driven gear outer diameter OD2, respectively.

First and second sealing surfaces 62 and 64 can be separated by suction chamber wall 68. Suction chamber wall 68 can extend longitudinally between first and second ends 54 and 56. Suction chamber wall 68 is configured to form suction chamber 92 (shown in FIG. 5). Suction chamber 92 is defined by suction chamber wall 68, planar running surface 84, third sealing surface 66, and surfaces of gear teeth 36 of drive gear 20 and gear teeth 38 of driven gear 22 extending between opposing first gear faces 44, 46 and second gear faces 48, 50 and between first and second sealing surfaces 62 and 64. Suction chamber wall 68 can be concave. Suction chamber wall 68 is spaced from drive gear 20 and driven gear 22 to form suction chamber 92 therebetween. Suction chamber wall 68 is disposed adjacent to fluid inlet 14 such that suction chamber 92 is open to fluid inlet 14. Suction chamber wall 68 can be spaced from planar running surface 84 by a gap defined by a height of scaling land 60.

Scaling land 60 can be disposed at second end 56 of suction housing 24. Scaling land 60 projects outward from second end 56. Scaling land 60 can form a rim around a portion of body 52 at second end 56. Sealing land 60 can have a split ring shape opening to suction chamber wall 68. Sealing land 60 can be an extension of first and second sealing surfaces 62 and 64. Sealing land 60 defines suction cavity 70 at second end 56. Suction cavity 70 can have an annular shape with an opening adjacent to suction chamber wall 68. Sealing land 60 is disposed adjacent to fluid inlet 14 on planar running surface 84. Suction cavity 70 is open to fluid inlet 14 and suction chamber 92.

Flange 58 can extend transverse to and outward from body 52 at first end 54 of suction housing 24. Flange 58 extends to flange end 82. Flange 58 can be flush with body 52 at first end 54. Flange 58 can include arcuate cutouts 78 and 80 disposed at opposite corners of flange end 82. Arcuate cutouts 78 and 80 are disposed adjacent to drive gear shaft 32 and driven gear shaft 34 and are configured to accommodate rotation of drive gear shaft 32 and driven gear shaft 34, respectively. Flange 58 can include third sealing surface 66 disposed on a side of flange 58 opposite a surface extending from first end 54. Third sealing surface 66 can be planar and disposed adjacent to first gear faces 44 and 46 of drive gear 20 and driven gear 22, respectively.

First retention member 74 is disposed on first end 54 of suction housing 24. First retention member 74 is configured to retain first biasing member 28 against suction housing 24. First retention member 74 can be disposed on a portion of flange 58 opposite third sealing surface 66. As illustrated, first retention member 74 can be a cylindrical body that protrudes from first end 54 and flange 58 with an outer surface configured to receive first biasing member 28. First retention member 74 can have any shape or additional features configured to retain first biasing member 28 against suction housing 24.

Body 52 can have a semi-cylindrical or curved surface opposite first and second sealing surfaces 60 and 62 and suction chamber wall 68. Second retention member 76 is disposed on the surface of body 52 opposite first and second sealing surfaces 60 and 62 and suction chamber wall 68. Second retention member 76 is configured to retain second biasing member 30 against suction housing 24. As illustrated, second retention member 76 can be a cylindrical body that protrudes from the surface of body 52 with an outer surface configured to receive second biasing member 30. Second retention member 76 can have any shape or additional features configured to retain second biasing member 30 against suction housing 24.

First and second biasing members 28 and 30 can be coiled springs. First biasing member 28 extends between top wall 88 of cavity 18 and suction housing 24 at first end 54. Second biasing member 30 extends from side wall 86 of cavity 18 to suction housing 24 on a surface opposite suction chamber wall 68. First biasing member 28 is configured to apply an axial force on suction housing 24 along an axis parallel drive gear and driven gear axes A1 and A2. Second biasing member 30 is configured to apply a radial force on suction housing 24 transverse to the axial force applied by first biasing member 28. First biasing member 28 extends orthogonal to second biasing member 30. First and second biasing members 28 and 30 are configured to apply axial and radial forces to suction housing 24 sufficient to maintain contact between first scaling surface 62 and gear teeth tips 40 of drive gear 20, between second sealing surface 64 and gear teeth tips 42 of driven gear 22, and between third sealing surface 66 and first gear faces 44 and 46 of drive gear 20 and driven gear 22, respectively. In a non-limiting example, first and second biasing members 28 and 30 can have a spring force equal to about 50 Newtons.

As illustrated in FIG. 5, suction housing 24 can be disposed adjacent to and in contact with each of drive gear 20 and driven gear 22. First sealing surface 62 can be disposed in contact with gear teeth tips 40 of drive gear 20. Second sealing surface 64 can be disposed in contact with gear teeth tips 42 of driven gear 22. Third sealing surface 66 (shown in FIG. 4) of flange 58 can be disposed in contact with each of first gear face 44 of drive gear 20 and first gear face 46 of driven gear 22. Second gear face 48 (not shown) of drive gear 20 and second gear face 50 (shown in FIG. 4) of driven gear 22 can be disposed in contact with planar running surface 84.

Rotation of gears creates suction in suction cavity 70 and suction chamber 92 fluidly connected thereto. Fluid received from fluid inlet 14 is carried by drive gear 20 and driven gear 22 meshing into pressure chamber (or cavity) 90. Pressure chamber 90 is a portion of cavity 18 defined by planar running surface 84, side wall 86, and top wall 88 disposed on the side of the gear meshing point opposite suction chamber 92. As pressure in pressure chamber 90 increases during operation of gear pump 10, fluid in pressure chamber 90 can exert axial and radial forces on suction housing 24 as provided by first and second biasing members 28 and 30.

Figure 6:
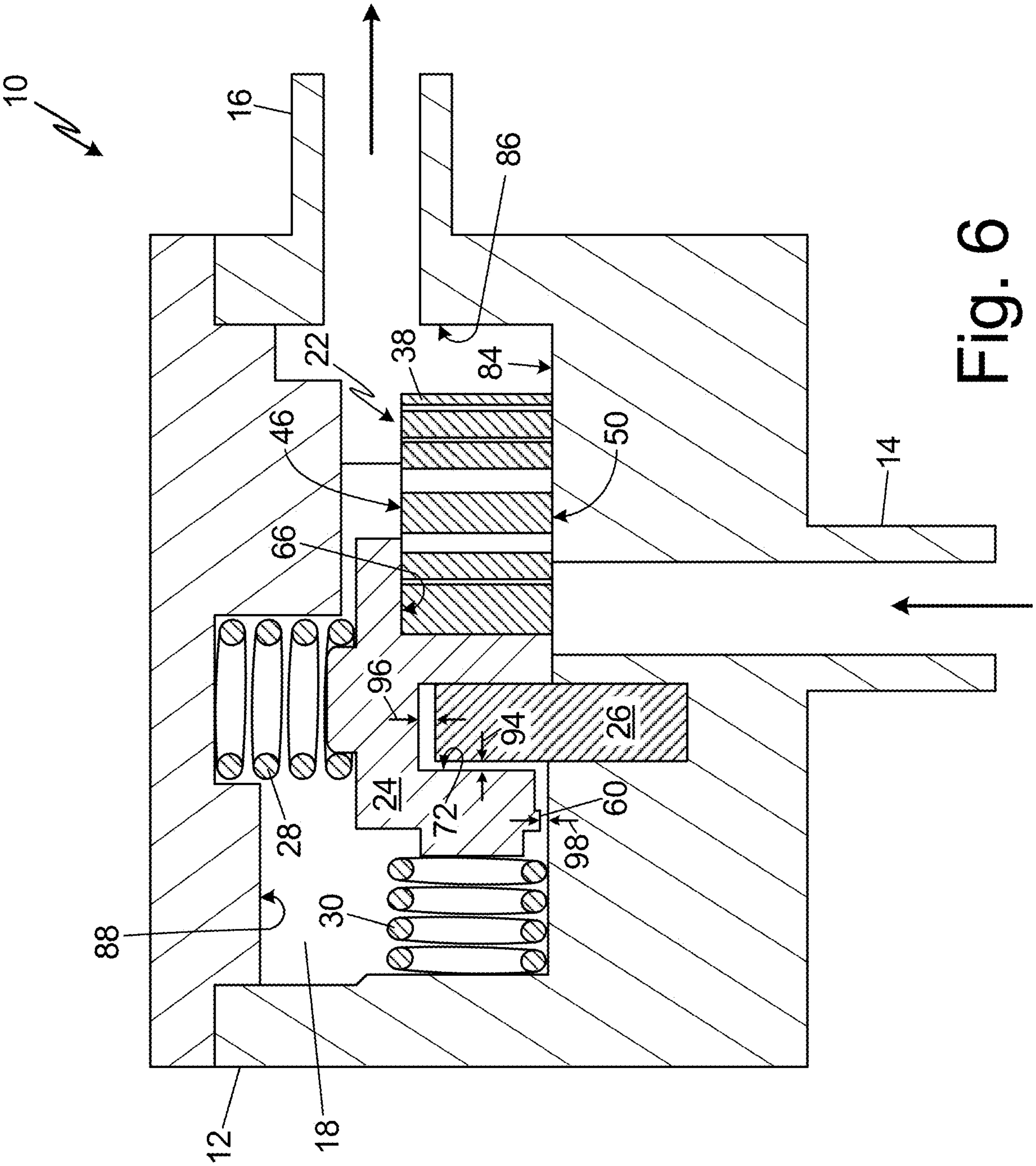
FIG. 6 is a cross-sectional view of the portion of the gear pump of FIG. 1 prior to operation.

FIG. 6 is a cross-sectional view of gear pump 10 of FIG. 1 prior to operation of gear pump 10. FIG. 6 shows housing 12, fluid inlet 14, fluid outlet 16, cavity 18, driven gear 22, suction housing 24, cylinder pin 26, first biasing member 28, second biasing member 30, gear teeth 38, first gear face 46, second gear face 50, scaling land 60, third sealing surface 66, bore wall 72, planar running surface 84, side wall 86, top wall 88, axial gap 94, and radial gaps 96 and 98.

Prior to use, gear pump 10 is subjected to a run-in process configured to cause drive gear 20 and driven gear 22 to wear into the sealing surfaces in first, second, and third sealing surfaces 62, 64, 66 of suction housing 24 such that a tight seal is provided between suction chamber 92 (including suction cavity 70) and pressure chamber 90. As described further herein, axial gap 94 and radial gaps 96 and 98 are provided prior to the run-in process to allow first and second biasing members 28 and 30 to force first, second, and third sealing surfaces 62, 64, and 66 of suction housing 24 closer to sealing surfaces of drive gear 20 and driven gear 22 (i.e., gear teeth tips 40 and 42 and first gear faces 44 and 46) and to press second gear faces 48 and 50 against planar running surface 84.

Axial gap 94 is provided between cylinder pin 26 and bore wall 72 along the length of bore wall 72. Axial gap 94 is disposed on a side of cylinder pin 26 nearest second retention member 74 and opposite a side nearest suction chamber wall 68. Axial gap 94 can have a width equal to or less than 0.03 millimeters. As material is removed during the run-in process from first and second sealing surfaces 62 and 64 by drive gear 20 and driven gear 22, respectively, suction housing 24 is moved radially by the force applied to suction housing 24 by second biasing member 30. As suction housing 24 moves radially, axial gap 94 reduces in size until bore wall 72 abuts cylinder pin 26. As axial gap 94 closes, an axial gap of the same size forms on the opposite side of cylinder pin 26 between cylinder pin 26 and bore wall 72.

Radial gap 96 is provided between planar running surface 84 and sealing land 60. Radial gap 98 is provided between closed bore end 73 and cylinder pin 26. Radial gap 96 can have a height equal to or less than 0.03 millimeters. Radial gap 98 can have a height greater than the height of radial gap 96. Radial gaps 96 and 98 accommodate wear on third sealing surface 66 by allowing for axial movement of suction housing 24 toward first gear faces 44 and 46 of drive gear 20 and driven gear 22, respectively, as an axial force is applied to suction housing 24 by first biasing member 28. As material is removed from third sealing surface 66 by drive gear 20 and driven gear 22, suction housing 24 is moved axially by the axial force applied to suction housing 24. As suction housing 24 moves axially, radial gaps 96 and 98 reduce in size until sealing land 60 abuts planar running surface 84. A smaller radial gap 98 between closed bore end 73 and cylinder pin 26 can remain once sealing land 60 abuts planar running surface 84.

The amount of force provided by first and second biasing members 28 and 30 against suction housing 24, the duration the force is applied (i.e., duration of run-in process), the rotational speed of drive gear 20 and driven gear 22, and the material of suction housing 24 can be selected to reduce the clearance between sealing interfaces until the sealing surfaces touch and form a seal. Drive gear 20, driven gear 22, pump housing 12, and suction housing 24 can be formed of materials suitable for providing a desired wear on sealing surfaces 62, 64, and 66 and for accommodating the fluid handled at defined temperatures and pressures. In some examples, suction housing 24 can be perlitic-ferritic cast iron material with nodular graphite (e.g., GGG60), polyamide PA66 (nylon), or any other material with suitable wear properties. The material of suction housing 24 can be selected based in part on a pump pressure. For higher pressures, a metal with good lubrication capabilities is preferred; whereas, at lower pressure, a harder plastic with good lubrication properties can be sufficient. Drive gear 20 and driven gear 22 are made from a material having a hardness greater than a hardness of the material selected for suction housing 24, such that drive gear 20 and driven gear 22 only show minimal wear during the run-in process and thus do not cause a decrease in volumetric pump flow. Drive gear 20 and driven gear 22 can be, for example, carbon steel. The material of drive gear 20 and driven gear 22 can have a hardness of at least 5 HRC above the hardness of the material of suction housing 24.

During operation of gear pump 10 (i.e., following the run-in process), tight seals remain between suction chamber 92 and pressure chamber 90. During operation of gear pump 10, pressure builds in pressure chamber 90 and fluid in pressure chamber 90 presses suction housing 24 against first gear faces 44 and 46 and gear teeth tips 40 and 42.

Figure 7:
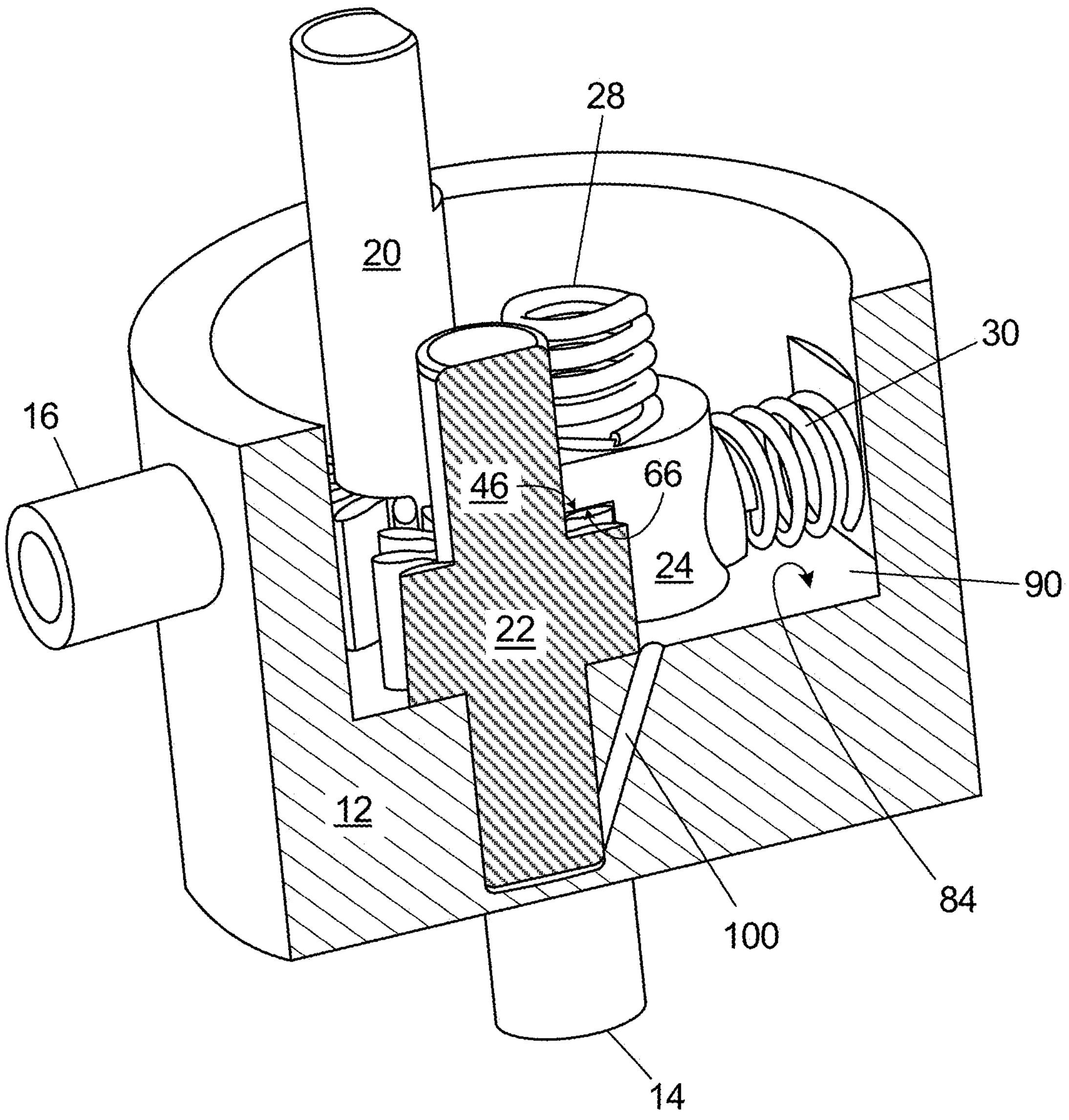
FIG. 7 is a perspective cross-sectional view of the portion of the gear pump of FIG. 1 taken along the 7-7 line of FIG. 5.

FIG. 7 is a cutaway cross-sectional view of gear pump 10 taken along the 7-7 line of FIG. 5. FIG. 7 shows pump housing 12, fluid inlet 14, fluid outlet 16, cavity 18, drive gear 20, driven gear 22, suction housing 24, first biasing member 28, second biasing member 30, first gear face 44, third sealing surface 66, planar running surface 84, and lubricant bore 100. Lubricant bore 100 is configured to provide lubricant to driven gear 22. Lubricant bore 100 extends from pressure cavity 90 to a base of shaft 34 of driven gear 32 in housing 12. A similar lubricant bore can be provided to drive gear shaft 32.

The features of gear pump 10 and the run-in process disclosed herein are designed to achieve tighter sealing interfaces between suction chamber 92 and pressure chamber 90. Due to increased volumetric pump efficiency, the size of gear pump 10 can be reduced, leading to a reduction in weight and cost.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Any relative terms or terms of degree used herein, such as “substantially”, “essentially”, “generally”, “approximately” and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

In one aspect, a gear pump includes a pump housing, a drive gear meshed with a driven gear, a suction housing, and a suction cavity. The pump housing includes a cavity having a planar running surface, an inlet extending through the pump housing and opening to the cavity at the planar running surface, and an outlet extending through pump housing and opening to the cavity. The drive gear and driven gear are disposed in the cavity and have a first gear face and a second gear face with the second gear face disposed on the planar running surface. The suction housing includes a body portion extending longitudinally from a first end to a second end and having first and second sealing surfaces extending longitudinally between the first and second ends and disposed adjacent to outer diameters of the drive gear and the driven gear, respectively. A suction chamber wall is disposed between the first and second sealing surfaces and a sealing land is at the second end adjacent to the planar running surface. A flange of the suction housing extends transverse to the body at the first end and has a third sealing surface disposed in contact with the first gear face of each of the drive gear and the driven gear. The suction cavity is open to the inlet and defined in part by the suction chamber wall.

The gear pump of the preceding paragraph can optionally include, additionally and/or alternatively, any one or more of the following features, configurations, and/or additional components described further herein.

In an embodiment of the preceding gear pump, the sealing land can be separated from the planar running surface by a first gap.

In an embodiment of the preceding gear pump, the first gap can be equal to or less than 0.03 millimeters.

An embodiment of any of the preceding gear pumps can further include a first biasing member configured to press the third sealing surface against the first gear faces of the drive gear and the driven gear and a second biasing member configured to press the first and second sealing surfaces against the outer diameters of the drive gear and the driven gear.

In an embodiment of any of the preceding gear pumps, the body of suction housing further include a bore open to the second end and extending longitudinally to a closed end, the bore configured to receive a retention member connected to the pump housing.

In an embodiment of any of the preceding gear pumps, a wall defining the bore can extend parallel to the first and second sealing surfaces and wherein the wall can be separated from the retention member by a second gap.

In an embodiment of any of the preceding gear pumps, the closed end of the bore can be separated from the retention member by a third gap.

In an embodiment of any of the preceding gear pumps, the second gap can be disposed on a side of the bore nearest the second biasing member.

In an embodiment of any of the preceding gear pumps, the second gap can be equal to or less than 0.03 millimeters.

In an embodiment of any of the preceding gear pumps, the first and second biasing members can be coil springs.

In an embodiment of any of the preceding gear pumps, the suction housing can further include a first spring retention member protruding from the first end of the body a second spring retention member protruding from a side of the body disposed opposite the first and second scaling surfaces. The first biasing member can be compressed between the first end and a first wall of the cavity, and the second biasing member can be compressed between the side and a second wall of the cavity. The first biasing member can extend orthogonal to the second biasing member.

In an embodiment of any of the preceding gear pumps, the body of the suction housing can further include a suction cavity defined by the sealing land.

In an embodiment of any of the preceding gear pumps, the suction cavity can be annular and connected to the suction chamber wall.

In an embodiment of any of the preceding gear pumps, the suction housing can be formed of a material having a hardness less than a hardness of a material forming each of the drive gear and the driven gear.

In another aspect, a method of increasing efficiency of a gear pump includes providing a pump housing, a drive gear and a driven gear, and a suction housing, and applying an axial force and a radial force against the suction housing. The pump housing includes a cavity having a planar running surface, an inlet extending through the pump housing and opening to the cavity at the planar running surface, and an outlet extending through pump housing and opening to the cavity. The drive gear and the driven gear have parallel axes and mesh together, and each have a first gear face and a second gear face, the second gear face disposed on the planar running surface. The suction housing includes a first sealing surface and a second sealing surface extending parallel to and abutting outer diameters of the drive gear and the driven gear, respectively. A suction chamber wall is disposed between the first and second sealing surfaces and separated from the drive gear and the driven gear to form a suction chamber therebetween. A third sealing surface of the suction housing is disposed parallel to and abutting the second gear face of each of the drive gear and the driven gear, and a sealing land is disposed adjacent to the planar running surface. The axial force is applied to the suction housing to press the third sealing surface against the first gear faces of the drive gear and the driven gear. The radial force is applied to the suction housing to press the first and second sealing surfaces against the outer diameters of the drive gear and the driven gear.

The method pump of the preceding paragraph can optionally include, additionally and/or alternatively, any one or more of the following features, configurations, additional components, and/or steps described further herein.

In an embodiment of the preceding method, the sealing land can be separated from the planar running surface by a first gap.

An embodiment of the preceding method can further include reducing the size of the gap by operating the gear pump in a run-in process that includes removing material on the third sealing surface by the drive gear and the driven gear.

In an embodiment of any of the preceding methods, the suction housing can be attached to the pump housing by a retention member extending from the pump housing into a bore of the suction housing, wherein, at a start of the run-in process, a first side of the retention member abuts a first side of the bore and a second side of the retention member is spaced from a second side of the bore by a second gap, the second gap extending parallel to the first and second sealing surfaces.

An embodiment of any of the preceding methods can further include reducing a size of the second gap by removing material on the first and second sealing surfaces by the drive gear and the driven gear.

In an embodiment of any of the preceding methods, at an end of the run-in process, the second side of the retention member can abut the second side of the bore and the first side of the retention member is separated from the first side of the bore by a third gap.

In an embodiment of any of the preceding methods, applying an axial force can be performed by a first biasing member disposed between the pump housing and the suction housing.

In an embodiment of any of the preceding methods, applying a radial force can be performed by a second biasing member disposed between the pump housing and the suction housing.

In an embodiment of any of the preceding methods, reducing the size of the first gap provides a seal between the scaling land and the running surface.

The invention claimed is:

1. A gear pump comprising:
- a pump housing comprising:
  - a cavity having a planar running surface;
  - an inlet extending through the pump housing and opening to the cavity at the planar running surface; and
  - an outlet extending through pump housing and opening to the cavity;
- a drive gear and a driven gear disposed in the cavity and meshing together, each of the drive gear and the driven gear having a first gear face and a second gear face, the second gear face disposed on the planar running surface;
- a suction housing comprising:
  - a body portion extending longitudinally from a first end to a second end, the body portion comprising:
    - first and second sealing surfaces extending longitudinally between the first and second ends and disposed adjacent to outer diameters of the drive gear and the driven gear, respectively;
    - a suction chamber wall disposed between the first and second sealing surfaces; and
    - a sealing land at the second end, the sealing land disposed adjacent to the planar running surface; and
  - a flange extending transverse to the body at the first end, the flange having a third sealing surface disposed in contact with the first gear face of each of the drive gear and the driven gear; and
- a suction cavity open to the inlet and defined in part by the suction chamber wall.

2. The gear pump of claim 1, wherein the sealing land is separated from the planar running surface by a first gap.

3. The gear pump of claim 1 and further comprising:
- a first biasing member configured to press the third sealing surface against the first gear faces of the drive gear and the driven gear;
- a second biasing member configured to press the first and second sealing surfaces against the outer diameters of the drive gear and the driven gear.

4. The gear pump of claim 3, wherein the body of the suction housing further comprises a bore open to the second end and extending longitudinally to a closed end, the bore configured to receive a retention member connected to the pump housing, and wherein a wall defining the bore extends parallel to the first and second sealing surfaces and wherein the wall is separated from the retention member by a second gap.

5. The gear pump of claim 4, wherein the closed end of the bore is separated from the retention member by a third gap.

6. The gear pump of claim 4, wherein the second gap is disposed on a side of the bore nearest the second biasing member.

7. The gear pump of claim 4, wherein the second gap is equal to or less than 0.03 millimeters.

8. The gear pump of claim 3, wherein the first and second biasing members are coil springs.

9. The gear pump of claim 8, wherein suction housing further comprises:

a first spring retention member protruding from the first end of the body; and a second spring retention member protruding from a side of the body disposed opposite the first and second sealing surfaces;

wherein the first biasing member is compressed between the first end and a first wall of the cavity and the second biasing member is compressed between the side and a second wall of the cavity; and wherein the first biasing member extends orthogonal to the second biasing member.

10. The gear pump of claim 1, wherein the body of the suction housing further comprises a suction cavity defined by the sealing land.

11. The gear pump of claim 10, wherein the suction cavity is annular and is connected to the suction chamber wall.

12. The gear pump of claim 1, wherein the suction housing is formed of a material having a hardness less than a hardness of a material forming each of the drive gear and the driven gear.

13. A method of increasing efficiency of a gear pump, the method comprising:

providing a pump housing comprising:

a cavity having a planar running surface;

an inlet extending through the pump housing and opening to the cavity at the planar running surface; and an outlet extending through pump housing and opening to the cavity;

providing a drive gear and a driven gear in the cavity, the drive gear and the driven gear having parallel axes and meshing together, and each of the drive gear and the driven gear having a first gear face and a second gear face, the second gear face disposed on the planar running surface;

providing a suction housing in the cavity, wherein the suction housing comprises:

a first sealing surface and a second sealing surface extending parallel to and abutting outer diameters of the drive gear and the driven gear, respectively;

a suction chamber wall disposed between the first and second sealing surfaces and separated from the drive gear and the driven gear to form a suction chamber therebetween;

a third sealing surface disposed parallel to and abutting the first gear face of each of the drive gear and the driven gear; and a sealing land disposed adjacent to the planar running surface;

applying an axial force to the suction housing to press the third sealing surface against the first gear faces of the drive gear and the driven gear; and applying a radial force to the suction housing to press the first and second sealing surfaces against the outer diameters of the drive gear and the driven gear.

14. The method of claim 13 wherein the sealing land is separated from the planar running surface by a first gap and further comprising reducing the size of the gap by operating the gear pump in a run-in process, the run-in process comprising removing material on the third sealing surface by the drive gear and the driven gear.

15. The method of claim 14, wherein the suction housing is attached to the pump housing by a retention member extending from the pump housing into a bore of the suction housing, wherein, at a start of the run-in process, a first side of the retention member abuts a first side of the bore and a second side of the retention member is spaced from a second side of the bore by a second gap, the second gap extending parallel to the first and second sealing surfaces.

16. The method of claim 15 and further comprising reducing a size of the second gap by removing material on the first and second sealing surfaces by the drive gear and the driven gear.

17. The method of claim 16, wherein, at an end of the run-in process, the second side of the retention member abuts the second side of the bore and the first side of the retention member is separated from the first side of the bore by a third gap.

18. The method of claim 17, wherein applying an axial force is performed by a first biasing member disposed between the pump housing and the suction housing.

19. The method of claim 18, wherein applying a radial force is performed by a second biasing member disposed between the pump housing and the suction housing.

20. The method of claim 14, wherein reducing the size of the first gap provides a seal between the sealing land and the planar running surface.

* * * * *